US008868583B2

(12) United States Patent
Kitajima et al.

(10) Patent No.: US 8,868,583 B2
(45) Date of Patent: Oct. 21, 2014

(54) SIMILARITY CALCULATION APPARATUS

(75) Inventors: Shinya Kitajima, Kawasaki (JP); Atsuji Sekiguchi, Kawasaki (JP); Hiroshi Otsuka, Kawasaki (JP); Yuji Wada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/007,921

(22) Filed: Jan. 17, 2011

(65) Prior Publication Data
US 2011/0184968 A1 Jul. 28, 2011

(30) Foreign Application Priority Data

Jan. 27, 2010 (JP) ................................. 2010-015734

(51) Int. Cl.
G06F 17/30 (2006.01)
(52) U.S. Cl.
CPC .... G06F 17/30495 (2013.01); G06F 17/30533 (2013.01); G06F 17/30575 (2013.01); G06F 17/30566 (2013.01)
USPC .......................................... 707/758; 707/780
(58) Field of Classification Search
USPC ................. 707/609, 682, 723, 758, 769, 780; 709/220, 222, 223
See application file for complete search history.

(56) References Cited

U.S. PATENT DOCUMENTS

| 6,347,313 | B1 * | 2/2002 | Ma et al. ........................ 707/711 |
| 6,460,036 | B1 * | 10/2002 | Herz ............................. 707/748 |
| 6,473,659 | B1 * | 10/2002 | Shah et al. ...................... 700/79 |
| 7,921,121 | B2 * | 4/2011 | Muller .......................... 707/749 |
| 8,655,899 | B2 * | 2/2014 | Kenedy et al. ................. 707/758 |
| 2001/0013072 | A1 * | 8/2001 | Okada et al. ................... 709/315 |
| 2002/0029300 | A1 * | 3/2002 | Okada et al. ................... 709/318 |
| 2006/0080299 | A1 * | 4/2006 | Shimogori et al. ................ 707/3 |
| 2006/0224436 | A1 * | 10/2006 | Matsumoto et al. ............ 705/10 |
| 2008/0005186 | A1 * | 1/2008 | Ayachitula et al. ............ 707/200 |
| 2008/0195607 | A1 * | 8/2008 | Kutsumi et al. .................... 707/5 |
| 2008/0301081 | A1 * | 12/2008 | Karnik et al. ..................... 706/48 |
| 2009/0327001 | A1 * | 12/2009 | Ayachitula et al. ............... 705/7 |
| 2011/0238658 | A1 * | 9/2011 | Schimmelpfeng ............. 707/723 |
| 2013/0159310 | A1 * | 6/2013 | Birdwell et al. ............... 707/737 |

FOREIGN PATENT DOCUMENTS

JP 1996-249338 A 9/1996
JP 2004-21880 A 1/2004

(Continued)

OTHER PUBLICATIONS

Japanese Office Action mailed Nov. 26, 2013 for corresponding Japanese Application No. 2010-015734, with Partial English-language Translation.

*Primary Examiner* — Jacob F Bétit
*Assistant Examiner* — Bao Tran
(74) *Attorney, Agent, or Firm* — Fujitsu Patent Center

(57) ABSTRACT

A relationship-information storage unit stores relationships between configuration items. The configuration items belong to an information system and are stored in multiple databases. A first counting unit compares, across the databases, attribute values of one configuration item in each of the databases, thereby counting a matching-attribute-value count. A second counting unit identifies a configuration item having a relationship with the one configuration item, for which the first counting unit counts the matching-attribute-value count, by referring to the relationship-information storage unit. Then, the second counting unit compares, across the databases, attribute values of the identified configuration items to count a matching-attribute-value count. A similarity calculation unit calculates similarity between the configuration items, based on the matching-attribute-value count counted by the first counting unit and the matching-attribute-value count counted by the second counting unit.

5 Claims, 12 Drawing Sheets

(56) References Cited

FOREIGN PATENT DOCUMENTS

| | | |
|---|---|---|
| JP | 2004-86782 A | 3/2004 |
| JP | 2004-348555 A | 12/2004 |
| JP | 2006-099236 A | 4/2006 |
| JP | 2007-304796 A | 11/2007 |
| JP | 2009-217426 A | 9/2009 |
| JP | 2009-245029 A | 10/2009 |

* cited by examiner

```
<A-XML:Switch nickname="sw01" ipaddr="192.168.0.1">
  <A-XML:manufacture country="jp">fujitsu</A-XML:manufacture>
</A-XML:Switch>
```

```
<B-XML:sw name="sw01" ip_addr="192.168.0.1">
  <B-XML:mfr>fujitsu</B-XML:mfr>
</B-XML:sw>
```

| ATTRIBUTE NAME | ATTRIBUTE VALUE |
|---|---|
| Switch/@nickname | sw01 |
| Switch/@ipaddr | 192.168.0.1 |
| Switch/manufacture | fujitsu |
| Switch/manufacture/@country | jp |

FIG.7

| ATTRIBUTE NAME | ATTRIBUTE VALUE |
|---|---|
| Server/@nickname | svr01 |
| Server/@ipaddr | 192.168.0.2 |
| Server/manufacture | fujitsu |
| Server/manufacture/@country | jp |
| Server/cpu | XXX2.6GHz |

FIG.8

| ATTRIBUTE NAME | ATTRIBUTE VALUE |
|---|---|
| Server/@nickname | svr02 |
| Server/@ipaddr | 192.168.0.3 |

FIG.9

| ATTRIBUTE NAME | ATTRIBUTE VALUE |
|---|---|
| Service/@nickname | svc01 |
| Service/@application | manager01 |
| Service/company | fujitsu |
| Service/company/@country | jp |
| Service/database | db01 |
| Service/database/@owner | fujitsu |
| Service/date | 20140930 |

FIG.10

| ATTRIBUTE NAME | ATTRIBUTE VALUE |
|---|---|
| sw/@name | sw01 |
| sw/@ip_addr | 192.168.0.1 |
| sw/mfr | fujitsu |

FIG.11

| ATTRIBUTE NAME | ATTRIBUTE VALUE |
|---|---|
| svr/@name | svr01 |
| svr/@ip_addr | 192.168.0.2 |
| svr/mfr | fujitsu |
| svr/cpu | YYY2.6GHz |

FIG.12

| ATTRIBUTE NAME | ATTRIBUTE VALUE |
|---|---|
| svr/@name | svr02 |
| svr/@ip_addr | 192.168.0.3 |

| ATTRIBUTE NAME | ATTRIBUTE VALUE |
|---|---|
| svc/@name | svc01 |
| svc/@app | manager01 |
| svc/co | fujitsu |
| svc/db | db01 |
| svc/dt | 20140930 |

| CONFIGURATION ITEM IN A-XML | CONFIGURATION ITEM IN B-XML |
|---|---|
| Switch1 | sw1 |
| Server1 | svr1 |
| Switch2 | sw2 |
| ... | ... |

| HOP COUNT | MATCH COUNT |
|---|---|
| 0 | 6 |
| 1 | 10 |
| 2 | 10 |
| SIMILARITY | 26 |

FIG.21

| HOP COUNT | MATCH COUNT | ATTRIBUTE-VALUE COUNT |
|---|---|---|
| 0 | 6 | 7 |
| 1 | 10 | 13 |
| 2 | 10 | 12 |
| TOTAL | 26 | 32 |
| SIMILARITY | 26/32 = 0.8125 | |

FIG.22

| HOP COUNT | RECIPROCAL | MATCH COUNT | RESULT |
|---|---|---|---|
| 0 | 1 | 6 | 6 |
| 1 | 0.5 | 10 | 5 |
| 2 | 0.33 | 10 | 3.3 |
| SIMILARITY | 14.3 | | |

FIG.23

| HOP COUNT | RECIPROCAL | MATCH COUNT | ATTRIBUTE-VALUE COUNT | RESULT |
|---|---|---|---|---|
| 0 | 1 | 6 | 7 | 0.86 |
| 1 | 0.5 | 10 | 13 | 0.38 |
| 2 | 0.33 | 10 | 12 | 0.28 |
| SIMILARITY | 1.52 | | | |

SIMILARITY CALCULATION APPARATUS

CROSS-REFERENCE TO RELATED APPLICATION

This application is based upon and claims the benefit of priority of the prior Japanese Patent Application No. 2010-015734, filed on Jan. 27, 2010, the entire contents of which are incorporated herein by reference.

FIELD

The embodiments discussed herein are directed to a similarity calculation apparatus and a computer-readable storage medium.

BACKGROUND

In recent years, management of hardware, software, data, and the like, which has conventionally been done by enterprise users and personal users by themselves, has been outsourced to outside companies to reduce management operation cost in some cases.

As a method for implementing such outsourcing, cloud computing has come into wide use. Cloud computing is a form of service that provides centralized management of hardware, software, data, and the like in an outside data center, or the like so that a user can use the hardware, software, data, and the like by using a Web browser or the like. Cloud computing includes, for example, SaaS (Software as a Service), PaaS (Platform as a Service), and IaaS (Infrastructure as a Service).

Companies that provide services by using cloud computing described above are introducing, as a method for managing data of different industries in a data center or the like, a federated configuration management database (FCMDB). The FCMDB is a technology that allows seamless federation of a plurality of systems by virtually integrating a plurality of databases (DBs) of different industries by using a CMDB proposed in the information technology infrastructure library (ITIL).

For instance, as illustrated in FIG. 28, an FCMDB is capable of virtually integrating and managing data (configuration items (CIs)) stored in a configuration-information management system (A-XML) and CIs stored in a service management system (B-XML). When information of a same type is stored in different DBs, the FCMDB establishes mappings between configuration items in the DBs to maintain synchronization and consistency of the configuration items.
Patent Document 1: Japanese Laid-open Patent Publication No. 2007-304796
Patent Document 2: Japanese Laid-open Patent Publication No. 08-249338

Virtually integrating different databases as described above is disadvantageous in that establishing configuration-item-to-configuration-item mappings between to-be-integrated databases spends a considerably long period of time.

More specifically, with enhancement in performance of computers in recent years, an amount data stored in a database has become enormous and complicated in configuration in many cases. Configuration-item-to-configuration-item mappings have conventionally been established manually by a user even when such databases as described above are virtually integrated, and therefore have spent a considerably long period of time.

SUMMARY

According to an aspect of an embodiment of the invention, A computer-readable, non-transitory medium storing therein a program for calculating similarity causing a computer to execute a process includes first counting a matching-attribute-value count by comparing, across a plurality of databases that store configuration items belonging to an information system, attribute values of one configuration item in each of the databases, the matching-attribute-value count being number of attribute values that are identical to each other; second counting a matching-attribute-value count by comparing, across the plurality of databases, attribute values of a configuration item that has a predetermined relationship with the one configuration item in each of the databases; and calculating similarity between the configuration items, of which matching-attribute-value counts each have been counted at any one of the first counting and the second counting, based on the matching-attribute-value count counted at the first counting and the matching-attribute-value count counted at the second counting.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram illustrating example attribute values belonging to a configuration item "Server1" in the A-XML;

FIG. 8 is a diagram illustrating example attribute values belonging to a configuration item "Server2" in the A-XML;

FIG. 9 is a diagram illustrating example attribute values belonging to the configuration item "Service1" in the A-XML;

FIG. 10 is a diagram illustrating example attribute values belonging to a configuration item "sw1" in the B-XML;

FIG. 11 is a diagram illustrating example attribute values belonging to a configuration item "svr1" in the B-XML;

FIG. 12 is a diagram illustrating example attribute values belonging to a configuration item "svr2" in the B-XML;

FIG. 21 is a diagram illustrating an example of similarity calculated as a ratio of a matching-attribute-value count;

FIG. 22 is a diagram illustrating an example of similarity calculated as a sum of matching-attribute-value counts each multiplied by a reciprocal of hop count;

FIG. 23 is a diagram illustrating an example of similarity calculated as a sum of ratios of matching-attribute-value counts each multiplied by a reciprocal of hop count;

DESCRIPTION OF EMBODIMENTS

Preferred embodiments of the present invention will be explained with reference to accompanying drawings. It may be noted that the embodiments are not intended to limit the scope of the invention.

[a] First Embodiment

Figure 1:
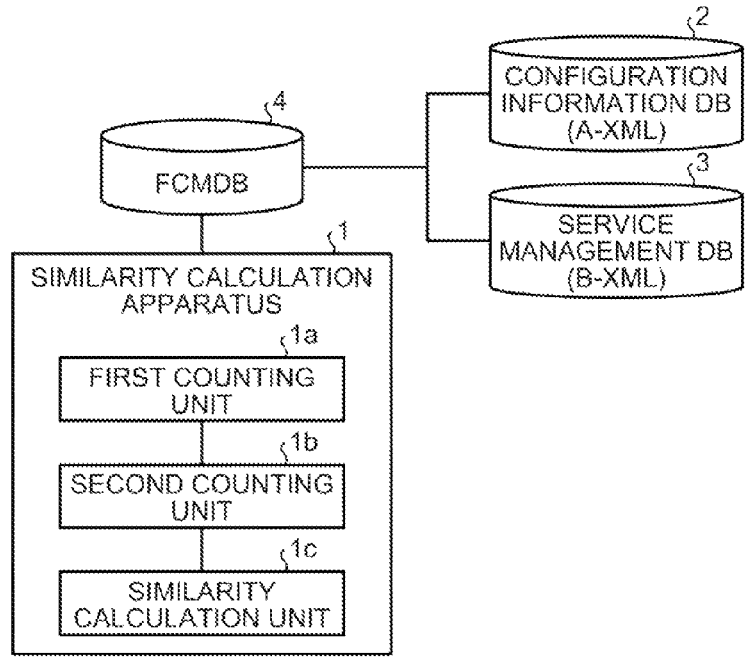
FIG. 1 is a block diagram illustrating the configuration of a similarity calculation apparatus according to a first embodiment of the present invention.

A similarity calculation apparatus 1 according to a first embodiment of the present invention is described with reference to FIG. 1. FIG. 1 is a block diagram illustrating the configuration of the similarity calculation apparatus 1 according to the first embodiment.

As illustrated in FIG. 1, the similarity calculation apparatus 1 is coupled to a federated configuration management database (FCMDB) 4, into which a configuration information DB 2 and a service management DB 3 are virtually integrated. Each of the configuration information DB 2 and the service management DB 3 is a storage unit that stores data in an extensible markup language (XML)-based file format. In this embodiment, the configuration information DB 2 stores an A-XML that manages configuration information pertaining to an information system and the like; the service management DB 3 stores a B-XML that manages service information pertaining to the information system and the like.

The FCMDB 4 is a storage unit that virtually integrates a plurality of DBs of different types by using a CMDB proposed in the ITIL. The FCMDB 4 in the present embodiment stores configuration items in the A-XML in the configuration information DB 2, which is to be subjected to virtual integration, and relationships between the configuration items. Examples of the relationship between configuration items include information that Server1 is connected to Switch1. The FCMDB 4 similarly stores configuration items in the B-XML in the service management DB 3, which is to be subjected to virtual integration, and relationships between the configuration items.

The similarity calculation apparatus 1 configured as described above extracts, from the configuration information DB 2 and the service management DB 3, a pair of configuration items that are similar to each other across the DBs. The similarity calculation apparatus 1 includes a first counting unit 1a, a second counting unit 1b, and a similarity calculation unit 1c.

The first counting unit 1a compares, across a plurality of databases that store configuration items belonging to an information system, attribute values of one configuration item in each of the databases, thereby counting the number (hereinafter, "matching-attribute-value count") of attribute values that are identical to each other. For instance, the first counting unit 1a compares attribute values of a configuration item A1 in the configuration information DB 2 managed by the FCMDB 4 against attribute values of a configuration item B1 in the service management DB 3, which is also managed by the FCMDB 4, thereby counting a matching-attribute-value count.

The second counting unit 1b compares, across the plurality of databases, attribute values of a configuration item that has a predetermined relationship with the one configuration item in each of the databases, thereby counting a matching-attribute-value count. For instance, the second counting unit 1b compares each of attribute values belonging to the configuration item A2 that has a relationship with the configuration item A1 in the configuration information DB against each of attribute values belonging to a configuration item B2 that has a relationship with the configuration item B1 in the service management DB 3, thereby counting a matching-attribute-value count. Similarly, the second counting unit 1b compares configuration items A3 to A5 each having relationship with the configuration item A1 against configuration items B3 to B5 each having relationship with the configuration item B1, thereby counting matching-attribute-value counts.

The similarity calculation unit 1c calculates similarity between configuration items, of which matching-attribute-value counts each have been counted by the first counting unit 1a or the second counting unit 1b, based on the matching-attribute-value counts counted by the first counting unit 1a and the second counting unit 1b. For instance, the similarity calculation unit 1c calculates a total of the matching-attribute-value counts counted by the first counting unit 1a and the second counting unit 1b. Subsequently, the similarity calculation unit 1c sets the total of the matching-attribute-value counts as similarity of a pair of configuration items, of which matching-attribute-value count has been counted the first counting unit 1a. The similarity calculation unit 1c calculates, for the pair of configuration items of which matching-attribute-value count has been counted by the second counting unit 1b, a total of matching-attribute-value counts from this pair of the configuration items to a pair of configuration items that has relationship with this pair, and sets the calculated total as similarity.

As described above, according to the first embodiment, similarity between a configuration item belonging to the configuration information DB 2 managed by the FCMDB 4 and a configuration item belonging to the service management DB 3 also managed by the FCMDB 4 is calculated. Accordingly, the similarity can be provided as information for use by a user to establish mapping between the configuration items. This leads to significant reduction in user's time and trouble as compared with a situation where mapping is established based on no information, thereby allowing saving of a period of time spent to establish mapping between configuration items stored in to-be-integrated databases when integration of the different databases is performed.

[b] Second Embodiment

A similarity calculation apparatus according to an embodiment of the invention can include, other than the control unit described in the first embodiment, a control unit so that, for instance, mapping information is automatically generated. Hence, a similarity calculation apparatus 10 according to a second embodiment of the invention that includes a control unit other than the control unit described in the first embodiment and automatically generates mapping information is described below.

Configuration of Similarity Calculation Apparatus

Figure 2:
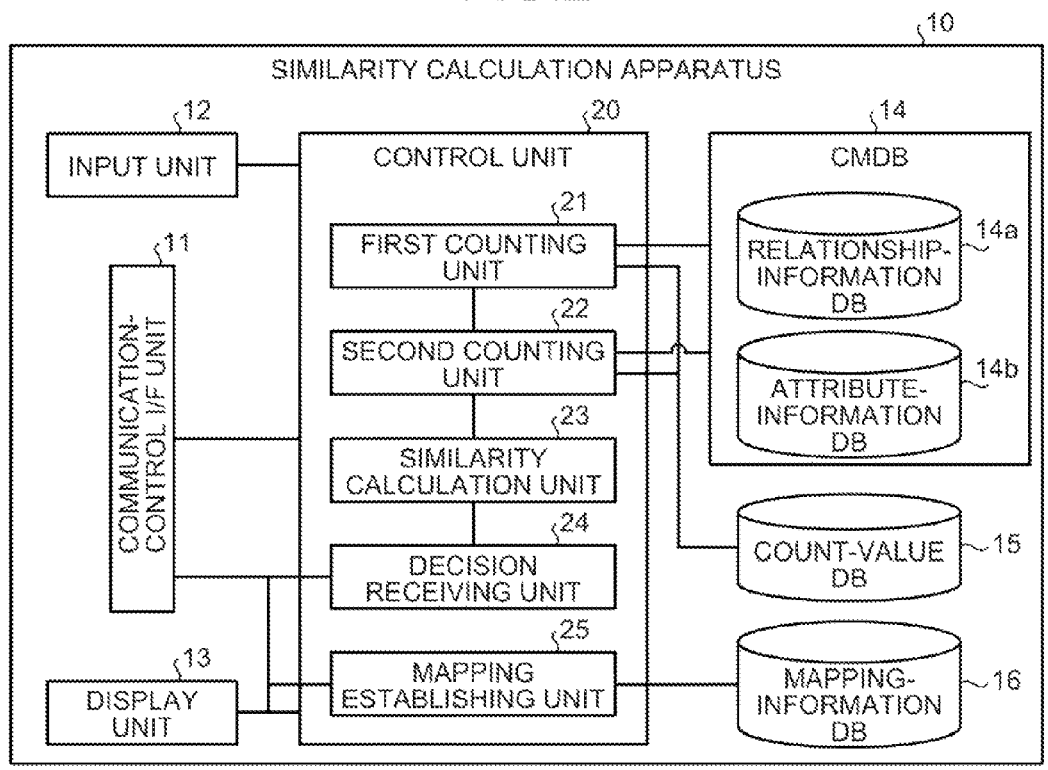
FIG. 2 is a block diagram illustrating the configuration of a similarity calculation apparatus according to a second embodiment of the present invention.

The configuration of the similarity calculation apparatus 10 according to the second embodiment is described with reference to FIG. 2. FIG. 2 is a block diagram illustrating the configuration of the similarity calculation apparatus 10 according to the second embodiment. As illustrated in FIG. 2, the similarity calculation apparatus 10 includes a communication control interface (I/F) unit 11, an input unit 12, a display unit 13, a CMDB 14, a count-value DB 15, a mapping-information DB 16, and a control unit 20

Databases, such as the CMDB 14, the count-value DB 15, and the mapping-information DB 16, can be, for instance, a storage device, such as semiconductor memory or a hard disk drive. The control unit 20 can be, for instance, an electronic circuit, such as a central processing unit (CPU) or a micro processing unit (MCU).

The communication control interface (I/F) unit 11, which is an interface that includes at least one communications port, controls information exchanged with other apparatus via the Internet and/or a various type of local area network (LAN). For instance, the communication-control I/F unit 11 receives an instruction for generation of mapping information and an instruction for stopping the generation from a management apparatus coupled to the Internet or the like and transmits mapping information generated by the control unit 20, which will be described later, to the management apparatus.

The input unit 12 can be, for instance, a keyboard, a mouse, and/or a microphone. The input unit 12 receives an instruction for generation of mapping information and an instruction for stopping the generation, and an input against a decision-prompting screen displayed on the display unit 13 by the control unit 20, which will be described later, and feeds the instruction and the input to the control unit 20, or the like. Meanwhile, the display unit 13, which will be described later, also functions as a pointing device by cooperating with the mouse. The display unit 13 can be, for instance, a monitor, a display, a touch panel, and/or a speaker. The display unit 13 displays the decision-prompting screen created by the control unit 20 to prompt for selection from "MATCH, NOT MATCH, PENDING", or the like to determine whether configuration items are similar CIs.

The CMDB 14 stores configuration items in an information system to be virtually integrated by the FCMDB, attribute values of the configuration items stored in databases to be virtually integrated by the FCMDB, and relationships between the configuration items stored in databases to be virtually integrated by the FCMDB. The CMDB 14 includes a relationship-information DB 14a and an attribute-information DB 14b.

Figures 3, 4, 5, 6:
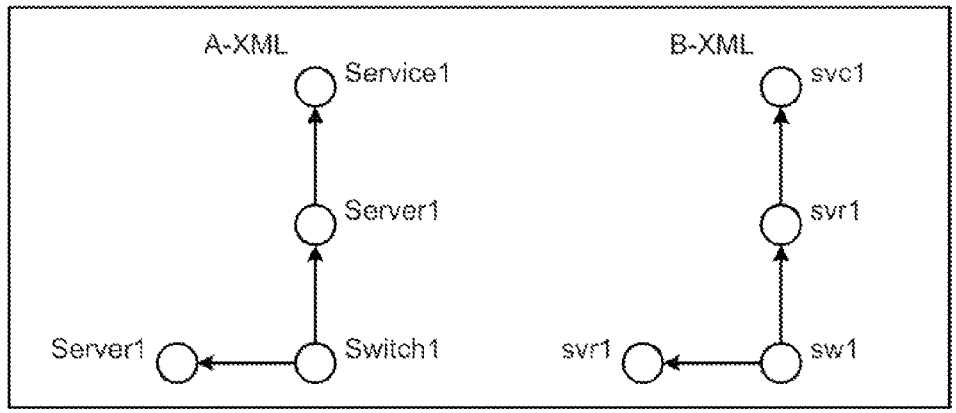
FIG. 3 is a diagram illustrating example data, which is to be stored in a virtually-integrated database, in an A-XML.
FIG. 4 is a diagram illustrating example data, which is to be stored in the virtually-integrated database, in a B-XML.
FIG. 5 is a diagram illustrating relationships between configuration items.
FIG. 6 is a diagram illustrating example attribute values belonging to a configuration item "Switch1" in the A-XML.

The relationship-information DB 14a stores relationships between configuration items belonging to the information system and stored in databases that are to be virtually integrated. For instance, the relationship-information DB 14a stores data in an A-XML illustrated in FIG. 3 and data in a B-XML illustrated in FIG. 4, and further stores relationships between configuration items in the A-XML and the B-XML as illustrated in FIG. 5. FIG. 3 is a diagram illustrating example data, which is to be stored in a virtually-integrated database, in the A-XML. FIG. 4 is a diagram illustrating example data, which is to be stored in the virtually-integrated database, in the B-XML. FIG. 5 is a view illustrating relationships between the configuration items.

With reference to the example data given in FIG. 3, a configuration item "Switch" in the A-XML, which is XML data, has an attribute value "sw01" specified by an attribute name "nickname" and an attribute value "192.168.0.1" specified by an attribute name "ipaddr". The configuration item "Switch" further has an attribute value "fujitsu" specified by an attribute name "manufacture" and an attribute value "jp" specified by an attribute name "manufacture country". With reference to the example data given in FIG. 4, a configuration item "sw" in the B-XML, which is XML data, has an attribute value "sw01" specified by an attribute name "sw name", an attribute value "192.168.0.1" specified by an attribute name "ip_addr", and an attribute value "fujitsu" specified by an attribute name "mfr".

With reference to FIG. 5, relationships among configuration items "Switch1", "Server1", and "Service1" of the A-XML are stored in the relationship-information DB 14a. More specifically, it is indicated in this example that each pair of "Switch1" and "Server1", and "Server1" and "Service1" has a relationship of hop count of one whereas a pair of "Switch1" and "Service1" has a relationship of hop count of two with "Server1" therebetween. Relationships among configuration items "sw1", "svr1", and "svc1" in the B-XML are also stored. More specifically, it is indicated in this example that each pair of "sw1" and "svr1", and "svr1" and "svc1" has a relationship of hop count of one whereas a pair of "sw1" and "svc1" has a relationship of hop count of two with "svr1" therebetween. Arrows in FIG. 5 are used to indicate, for instance, a general hierarchical structure.

The attribute-information DB 14b stores configuration items belonging to the information system, or, put another way, attribute information belonging to the configuration items stored in the relationship-information DB 14a. More specifically, the attribute-information DB 14b stores information illustrated in FIG. 6 to FIG. 9 as information about attribute values of the configuration items in the A-XML and information illustrated in FIG. 10 to FIG. 13 as information about attribute values of the configuration items in the B-XML.

Figures 13, 14, 15:
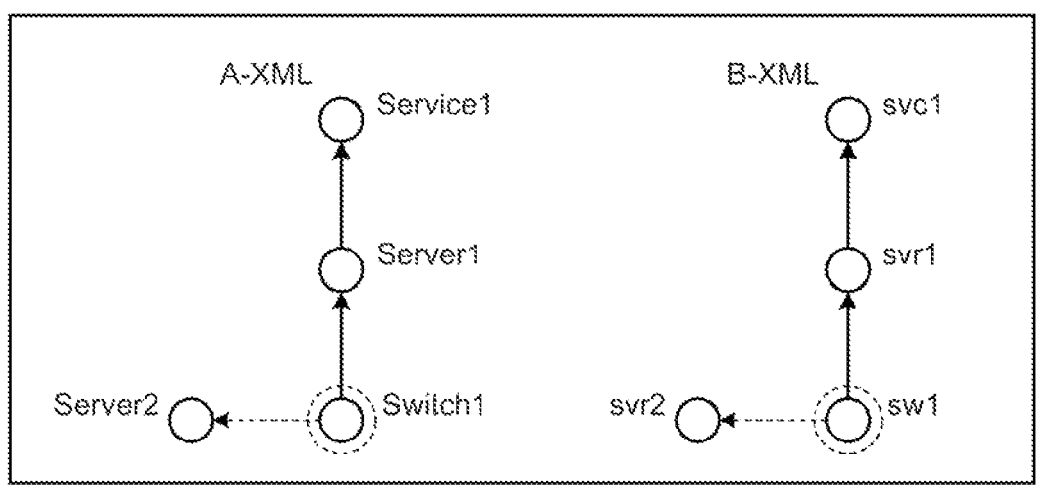
FIG. 13 is a diagram illustrating example attribute values belonging to a configuration item "svc1" in the B-XML.
FIG. 14 is a diagram illustrating example information stored in a mapping-information DB.
FIG. 15 is a diagram illustrating an example of comparison between attribute values with regard to arbitrarily-specified configuration items.

FIG. 6 is a diagram illustrating example attribute values belonging to the configuration item "Switch1" in the A-XML. FIG. 7 is a diagram illustrating example attribute values belonging to the configuration item "Server1" in the A-XML. FIG. 8 is a diagram illustrating example attribute values belonging to the configuration item "Server2" in the A-XML. FIG. 9 is a diagram illustrating example attribute values belonging to the configuration item "Service1" in the A-XML. FIG. 10 is a diagram illustrating example attribute values belonging to the configuration item "sw1" in the B-XML. FIG. 11 is a diagram illustrating example attribute values belonging to the configuration item "svr1" in the B-XML. FIG. 12 is a diagram illustrating example attribute values belonging to the configuration item "svr2" in the B-XML. FIG. 13 is a diagram illustrating example attribute values belonging to the configuration item "svc1" in the B-XML.

For instance, the attribute-information DB 14b stores, as "attribute name, attribute value" pairs of the configuration item "Switch1" in the A-XML, "Switch/@nickname, sw01" and "Switch/@ipaddr, 192.168.0.1" as illustrated in FIG. 6. The attribute-information DB 14b further stores, as "attribute name, attribute value" pairs of the configuration item "Switch1" in the A-XML, "Switch/manufacture, fujitsu" and "Switch/manufacture/@country, jp".

The attribute-information DB 14b also stores, as "attribute name, attribute value" pairs of the configuration item "Server1" in the A-XML, "Server/@nickname, svr01" and "Server/@ipaddr, 192.168.0.2" as illustrated in FIG. 7. The attribute-information DB 14b also stores, as "attribute name, attribute value" pairs of the configuration item "Server1" in the A-XML, "Server/manufacture, fujitsu", "Switch/manufacture/@country, jp", and "Server/cpu, XXX2.6 GHz".

The attribute-information DB 14b also stores, as "attribute name, attribute value" pairs of the configuration item "Server2" in the A-XML, "Server/@nickname, svr02" and "Server/@ipaddr, 192.168.0.3" as illustrated in FIG. 8.

The attribute-information DB 14b also stores, as "attribute name, attribute value" pairs of the configuration item "Service1" in the A-XML, "Service/@nickname, svc01", "Service/@application, manager01", and "Service/company, fujitsu" as illustrated in FIG. 9. The attribute-information DB 14b further stores, as "attribute name, attribute value" pairs of the configuration item "Service1" in the A-XML, "Service/company/@country, jp", "Service/database, db01", "Service/database/@owner, fujitsu", and "Server/date, 20140930".

The attribute-information DB 14b stores, as "attribute name, attribute value" pairs of the configuration item "sw1" in the B-XML, "sw/@name, sw01", "sw/@ip_addr, 192.168.0.1", and "sw/mfr, fujitsu" as illustrated in FIG. 10. The attribute-information DB 14b also stores, as "attribute name, attribute value" pairs of the configuration item "svr1" in the B-XML, "svr/@name, svr01", "svr/@jp_addr, 192.168.0.2", "svr/mfr, fujitsu", and "svr/cpu, YYY2.6 GHz" as illustrated in FIG. 11.

The attribute-information DB 14b stores, as "attribute name, attribute value" pairs of the configuration item "svr2" in the B-XML, "svr/@name, svr02" and "svr/@ip_addr, 192.168.0.3" as illustrated in FIG. 12. The attribute-information DB 14b also stores, as "attribute name, attribute value" pairs of the configuration item "svc1" in the B-XML, "svc/@name, svc01", "svc/@app, maneger01", "svc/co, fujitsu", "svr/db, db01", and "svr/dt, 20140930" as illustrated in FIG. 13.

Of the attribute names, each of "nickname" and "name" denotes a name of a server or a host; each of "ipaddr" and "ip_addr" denotes an internet protocol (IP) address of the server or the like. Of the attribute names, each of "manufacture", "mfr", and "company" denotes a manufacturing company of the server or the like or a service-provider company. Similarly, "manufacture/@country", "cpu", and "database" denote a country, to which the manufacturing company or the service provider company belongs, a processor being used, and a database to be used, respectively. Similarly, "database/@owner", "date", and "@application" denote an administrator of a database, a date when the database has been created or updated, and application software to be executed, respectively.

The mapping-information DB 16 stores mappings established by the control unit 20, which will be described later, between configuration items across databases. Referring back to FIG. 2, the count-value DB 15 stores values counted by a first counting unit 21 and a second counting unit 22, which will be described later. For instance, the count-value DB 15 stores information that the number of the matching attribute value count between the configuration items "Switch" and "sw1" is "3".

By way of the example described above, the mapping-information DB 16 stores, as "a configuration item in the A-XML, a configuration item in the B-XML" pairs, "Switch1, sw1", "Server1, svr1", "Switch2, sw2", and the like as illustrated in FIG. 14. More specifically, it is indicated in FIG. 14 that, for example, "Switch1", which is a configuration item in the A-XML and "sw1", which is a configuration item in the B-XML, are similar CIs. FIG. 14 is a diagram illustrating example information stored in the mapping-information DB 16.

The control unit 20 includes internal memory for storing control programs, such as an operating system (OS), computer program that defines various process procedures, and data therein. The control unit 20 further includes the first counting unit 21, the second counting unit 22, a similarity calculation unit 23, a decision receiving unit 24, and a mapping establishing unit 25 and causes these units to perform various processing.

The first counting unit 21 compares, across a plurality of databases containing a plurality of configuration items, attribute values of one configuration item in each of the databases, thereby counting a matching-attribute-value count. More specifically, the first counting unit 21 counts a matching-attribute-value count between one configuration item specified in the A-XML stored in the relationship-information DB 14a in the CMDB 14 and one configuration item specified in the B-XML stored in the relationship-information DB 14a by referring to the attribute-information DB 14b and stores the matching-attribute-value count in the count-value DB 15.

How the first counting unit 21 operates will be described by way of an example where a user has specified "Switch1" in the A-XML and "sw1" in the B-XML as illustrated in FIG. 15. The first counting unit 21 refers to the databases indicated in FIG. 6 and FIG. 10 to find that there are three attribute values, or, more specifically, "sw01", "192.168.0.1", and "fujitsu", that are identical to each other. The first counting unit 21 hence stores a matching-attribute-value count, "3", in the count-value DB 15 and sends a notification of count completion to the second counting unit 22.

The second counting unit 22 compares, across the plurality of databases, attribute values of a configuration item that has a relationship with the one configuration item in each of the databases, thereby counting a matching-attribute-value count. More specifically, the second counting unit 22 identifies configuration items each having relationship with the one configuration items, the matching-attribute-value count between which has been counted by the first counting unit 21, compares attribute values of the identified configuration items to count a matching-attribute-value count therebetween, and stores the count in the count-value DB 15. Thereafter, the second counting unit 22 sends a notification of count completion to the similarity calculation unit 23.

An example will be described with reference to FIG. 15. FIG. 15 is a diagram illustrating an example of comparison between attribute values with regard to arbitrarily-specified configuration items. When processing performed by the first counting unit 21 is completed, the second counting unit 22 identifies "Server1" that has a relationship of hop count of one with "Switch1" and "svr1" that has a relationship of hop count of one with "sw1". The second counting unit 22 compares attribute information pertaining to "Server1" illustrated in FIG. 7 and attribute information pertaining to "svr1" illustrated in FIG. 11 to find that there are three attribute values, or, more specifically, "svr01", "192.168.0.2", and "fujitsu", that are identical to each other. The second counting unit 22 therefore stores a matching-attribute-value count, "3", in the count-value DB 15.

Subsequently, the second counting unit 22 identifies "Server2" that has a relationship of hop count of one with "Switch1" and "svr2" that has a relationship of hop count of one with "sw1" in a similar manner. The second counting unit 22 compares attribute information pertaining to "Server2" illustrated in FIG. 8 and attribute information pertaining to "svr2" illustrated in FIG. 12 to find that there are two attribute values, or, more specifically, "svr02" and "192.168.0.3", that are identical to each other and stores a matching-attribute-value count, "2", in the count-value DB 15.

Subsequently, the second counting unit 22 identifies "Service1" that has a relationship of hop count of two with "Switch1" and "svc1" that has a relationship of hop count of two with "sw1" in a similar manner. The second counting unit 22 compares attribute information pertaining to "Service1" illustrated in FIG. 9 and attribute information pertaining to "svc1" illustrated in FIG. 13 to find that there are five attribute values, or, more specifically, "svc01", "manager01", "fujitsu", "db01", and "20140930", that are identical to each other. The second counting unit 22 stores a matching-attribute-value count, "5", in the count-value DB 15.

Figures 16, 17:
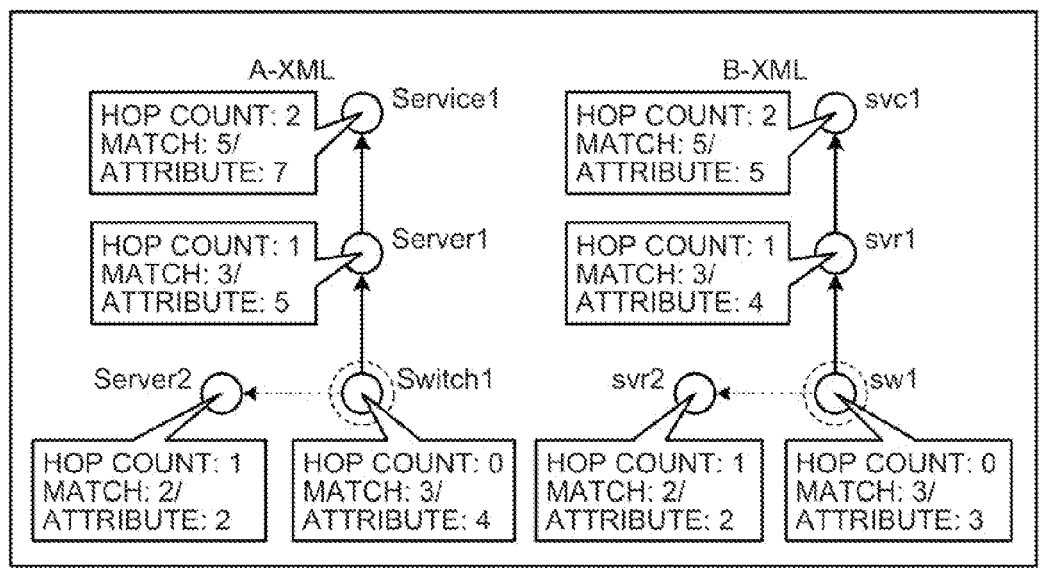
FIG. 16 is a diagram illustrating an example of counts each counted by a first counting unit or a second counting unit.
FIG. 17 is a diagram illustrating an example of similarity calculation.

Referring back to FIG. 2, the similarity calculation unit 23 calculates similarity between the configuration items, matching-attribute-value counts between which each have been counted by the first counting unit 21 or the second counting unit 22, based on the matching-attribute-value count counted by the first counting unit 21 and the matching-attribute-value count counted by the second counting unit 22. Assume that counts as illustrated in FIG. 16 are obtained by counting each performed by any one of the first counting unit 21 and the second counting unit 22. FIG. 16 is a diagram illustrating an example of counts each counted by the first counting unit or the second counting unit. It is indicated in FIG. 16 that, for example, of seven attribute values of "Service1" that has a relationship of hop count of two with "Switch1" in the A-XML, the number of attribute values that are identical to attribute values of "svc" in the B-XML is "5".

Calculation of similarity is described by way of an example of similarity between "Switch1" and "sw1" given in FIG. 16. The similarity calculation unit 23 sets hop count for "Switch1", for which similarity is to be calculated, to "0" and calculates a total of matching-attribute-value counts of each of hop count "0" to hop count "2". More specifically, as illustrated in FIG. 17, the similarity calculation unit 23 calculates "3+3=6" as a match count of hop count "0", "5+5=10" as a match count of hop count "1", and "5+5=10" as a match count of hop count "2"; thereafter, the similarity calculation unit 23 calculates "6+10+10=26" to obtain a total of these counts. The similarity calculation unit 23 sets the thus-obtained total value "26" as similarity between "Switch1" and "sw1". FIG. 17 is a diagram illustrating an example of similarity calculation.

Calculation of similarity between, for example, "Server1" and "svr1" will be described. The similarity calculation unit 23 sets hop count for "Switch1", for which similarity is to be calculated, to "0" and calculates a total of matching-attribute-value counts of each of hop count "0" to hop count "2". Note that calculations are to be performed only for directions indicated by arrows in FIG. 16. More specifically, as illustrated in FIG. 16, the similarity calculation unit 23 calculates "3+3=6" as a match count of hop count "0" and "5+5=10" as a match count of hop count "1", and calculates "6+10=16" as a total of these counts. The similarity calculation unit 23 sets the thus-obtained total value "16" as similarity between "Server1" and "svr1".

The similarity calculation unit 23 calculates similarities between the configuration items by the method described above and outputs calculation results to the decision receiving unit 24. Meanwhile, a configuration item whose hop count with the one configuration item, of which matching-attribute-value count has been counted by the first counting unit 21, is equal to or greater than a predetermined value can be excluded from configuration items involved in the similarity calculation so that a configuration item that has a weak relationship with the one configuration item is excluded from configuration items for use in similarity calculation.

Referring back to FIG. 2, the decision receiving unit 24 receives decisions, each indicating whether a pair of configuration items are similar CIs, from a user in a decreasing order of similarities calculated by the similarity calculation unit 23. Assume that, for instance, the similarity calculation unit 23 has calculated that similarity between "Switch1" and "sw1" is "10.48", similarity between "Server1" and "svr1" is "8.16", similarity between "Server2" and "svr2" is "6.32", and similarity between "Service1" and "svc1" is "7.62".

Figure 18:
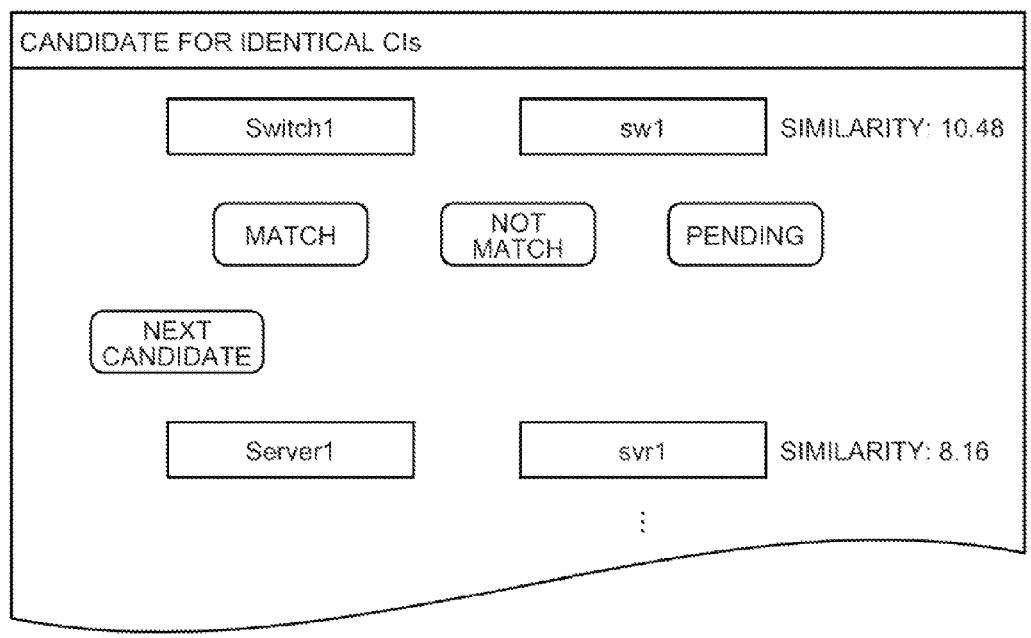
FIG. 18 is a diagram of an example screen that prompts for a decision input on whether a pair of configuration items is identical CIs.

In this case, the decision receiving unit 24 creates a screen that prompt for a decision input on whether "Switch1" and "sw1" of greatest similarity are similar CIs and displays the created screen on the display unit 13. The decision receiving unit 24 receives a decision input and outputs it to the mapping establishing unit 25. As illustrated in FIG. 18, a pair of configuration items which is candidate for identical CIs, similarity therebetween, a "MATCH" button, a "NOT MATCH" button, a "PENDING" button, and a pair of configuration items of next greatest similarity are displayed on this screen. FIG. 18 is a diagram of an example of the screen that prompts for a decision input on whether a pair of configuration items is identical CIs.

Upon detecting activation of the "MATCH" button via the input unit 12, the decision receiving unit 24 sends a notification that the displayed pair of configuration items are similar CIs to the mapping establishing unit 25. Subsequently, the decision receiving unit 24 creates a screen, which is similar to that described above, that prompts for a decision input about the pair of configuration items of next greatest similarity and displays the screen on the display unit 13. Meanwhile, the decision receiving unit 24 can be configured to prompt for a decision input only about a pair of configuration items similarity between which is equal to or greater than a threshold value.

Upon detecting activation of the "NOT MATCH" button via the input unit 12, the decision receiving unit 24 sends a notification that the displayed pair of configuration items are not similar CIs to the mapping establishing unit 25. Subsequently, the decision receiving unit 24 creates a screen, which is similar to that described above, that prompts for a decision input about the pair of configuration items of next greatest similarity and displays the screen on the display unit 13.

Upon detecting activation of the "PENDING" button via the input unit 12, the decision receiving unit 24 suspends prompting of a decision input on whether the displayed pair of configuration items are similar CIs. The decision receiving unit 24 then creates a screen, which is similar to that described above, that prompts for a decision input about a pair of configuration items of next greatest similarity and displays the screen on the display unit 13. Thereafter, upon detecting activation of the "MATCH" button or the "NOT MATCH" button via the input unit 12, the decision receiving unit 24 sends this decision about the displayed pair of configuration items to the mapping establishing unit 25. Subsequently, the decision receiving unit 24 creates a screen, which is similar to that described above, that prompts for a decision input about the suspended pair of configuration items and displays the screen on the display unit 13.

Figure 19:
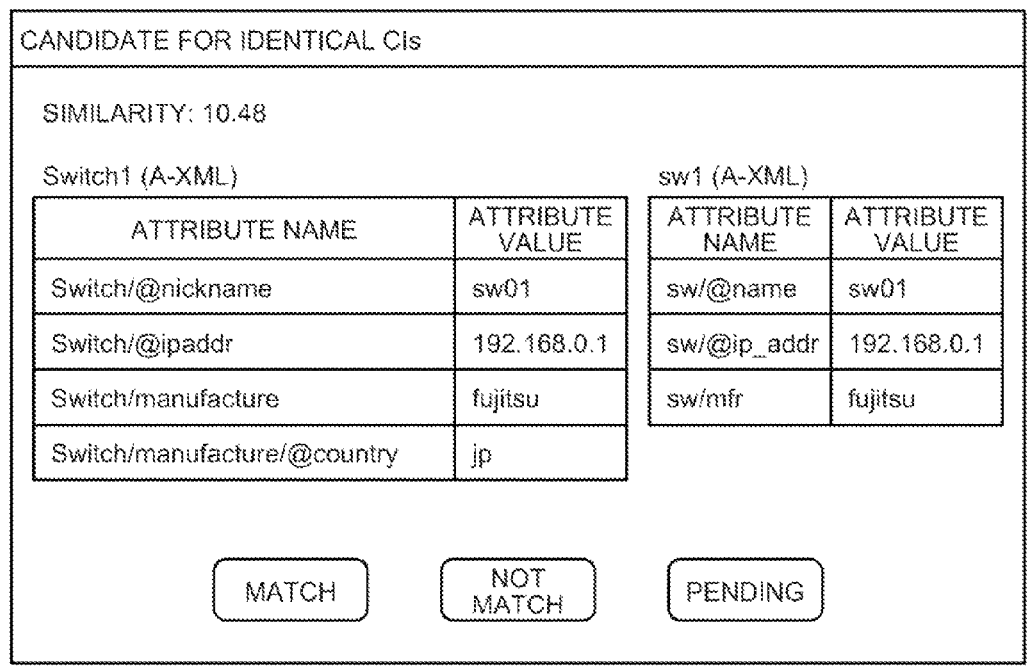
FIG. 19 is a diagram of another example screen that prompts for a decision input on whether a pair of configuration items is identical CIs.

As illustrated in FIG. 19, the screen can alternatively be configured to display all attribute values belonging to the configuration item "Switch1" and all attribute values belonging to the configuration item "sw1", for example. In the example illustrated in FIG. 19, the decision receiving unit 24 creates a screen where attribute names and attribute values (see FIG. 6) belonging to the configuration item "Switch1" and attribute names and attribute values (see FIG. 10) belonging to the configuration item "sw1" and displays the screen on the display unit 13. Using such a screen allows a user to make a decision on whether configuration items are similar CIs while referring to not only similarity therebetween but also attribute values thereof. This can lead to an increase in accuracy in decision. FIG. 19 is a diagram of an example screen that prompts for a decision input on whether a pair of configuration items is identical CIs.

The mapping establishing unit 25 establishes mapping between configuration items across a plurality of databases based on a decision received by the decision receiving unit 24. For instance, when the pair of the configuration items "Switch1" and "sw1" are similar CIs, or, put another way, "MATCH" has been selected by a user, the mapping establishing unit 25 stores information indicating that the configuration items "Switch1" and "sw1" are similar CIs in the mapping-information DB 16. When the pair of the configuration items "Switch1" and "sw1" are not to each other, or, put another way, "NOT MATCH" has been selected by a user, the mapping establishing unit 25 stores information indicating that the configuration items "Switch1" and "sw1" are not similar CIs in the mapping-information DB 16.

Operations Sequence

Figure 20:
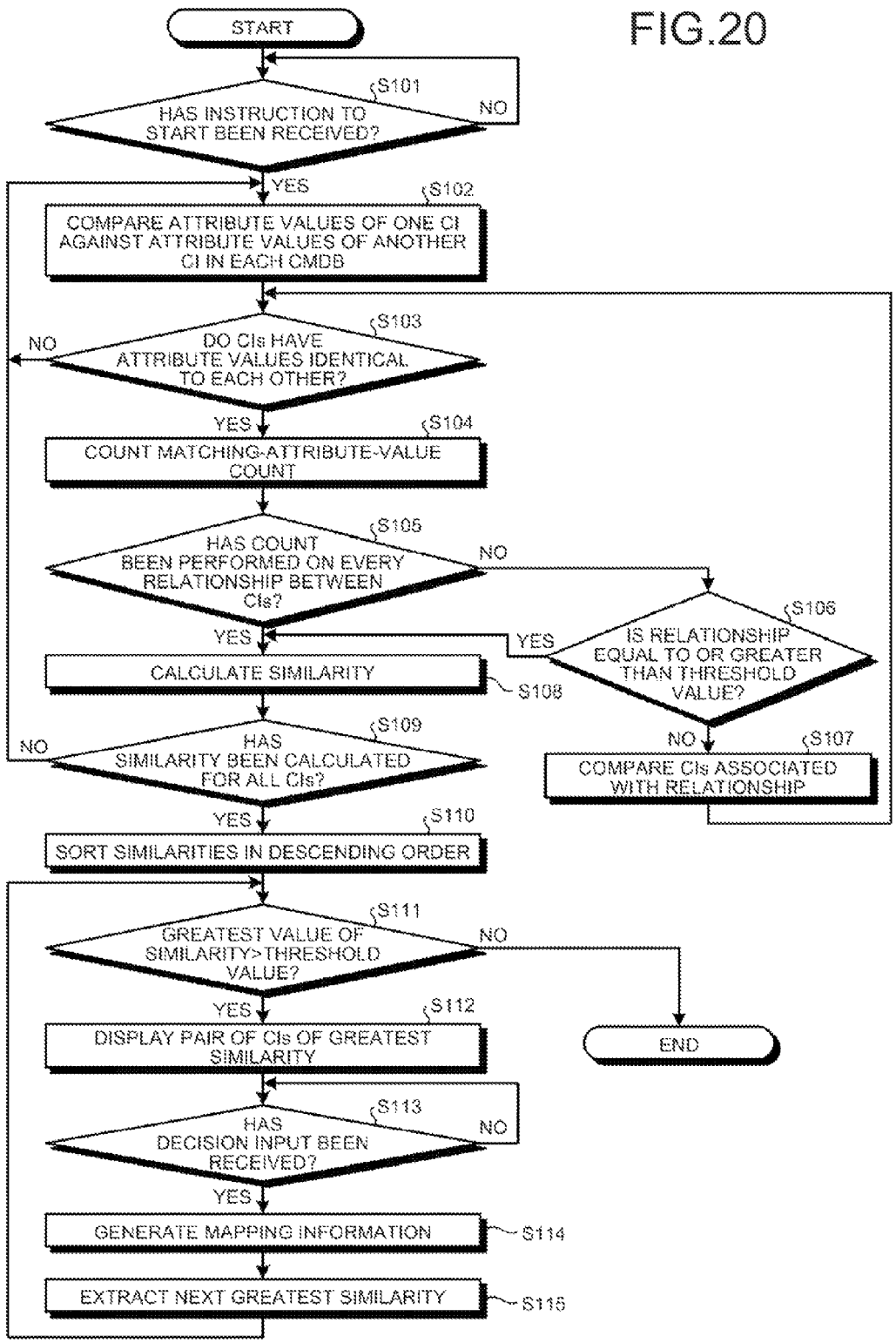
FIG. 20 is a flowchart of a sequence of operations to be performed by the similarity calculation apparatus according to the second embodiment of the present invention.

A sequence of operations to be performed by the similarity calculation apparatus according to the second embodiment is described below with reference to FIG. 20. FIG. 20 is a flowchart of the sequence of operations to be performed by the similarity calculation apparatus according to the second embodiment.

As illustrated in FIG. 20, when the input unit 12 or the like has received an instruction to start generation of mapping information (YES at Step S101), the first counting unit 21 of the similarity calculation apparatus 10 compares attribute values of one configuration item in the CMDB 14 against attribute values of another configuration item in the CMDB 14 (Step S102).

When the CIs have attribute values that are identical to each other (YES at Step S103), the first counting unit 21 counts a matching-attribute-value count and stores the count in the count-value DB 15 (Step S104). In contrast, when the CIs do not have attribute values that are identical to each other (NO at Step S103), process control returns to Step S102 to compare attribute values between another pair of configuration items.

The second counting unit 22 refers to the relationship-information DB 14*a* to determine whether attribute-value comparison has been performed on every relationship (hop count) between the configuration items, or, put another way, the configuration items compared at Step S102 (Step S105).

Subsequently, when attribute-value comparison has not been performed on every relationship (hop count) (NO at Step S105), the second counting unit 22 determines whether a relationship (hereinafter, "to-be-compared-next relationship") (hop count), on which attribute-value comparison is to be performed next, is equal to or greater than a threshold value (Step S106).

When the to-be-compared-next relationship (hop count) is smaller than the threshold value (NO at Step S106), the second counting unit 22 compares configuration items associated with each other with the to-be-compared-next relationship (hop count) (Step S107), and performs operations to be performed at Step S103 and following steps.

When the attribute-value comparison has been performed on every relationship (hop count) (YES at Step S105), the similarity calculation unit 23 calculates similarity between the configuration items by using any one of the methods described above (Step S108). Also when the to-be-compared-next relationship (hop count) is equal to or greater than the threshold value (YES at Step S106), the similarity calculation unit 23 calculates similarity between the configuration items by using any one of the methods described above (Step S108).

The similarity calculation unit 23 determines whether similarities have been calculated for every configuration item in the CMDB 14 (Step S109). If the similarities have not been calculated yet (NO at Step S109), the similarity calculation apparatus 10 repeats the operations at Step S102 and subsequent steps.

If the similarities have been calculated for every configuration item in the CMDB 14 (YES at Step S109), the decision receiving unit 24 sorts the obtained similarities in a descending order (Step S110) and determines whether a greatest value of the sorted similarities is greater than the threshold value (Step S111).

If the greatest value of the sorted similarities is greater than the threshold value (YES at Step S111), the decision receiving unit 24 displays a screen that displays the greatest similarity and a pair of configuration items of the greatest similarity on the display unit 13 (Step S112). The decision receiving unit 24 configures the screen, which is to be displayed on the display unit 13, to further contain items that prompt for a decision input on whether the pair of configuration items are similar CIs.

Upon receiving a decision input on whether the pair of configuration items are similar CIs entered by a user from the screen displayed at Step S112 (YES at Step S113), the mapping establishing unit 25 generates mapping information based on the decision (Step S114).

Subsequently, the decision receiving unit 24 specifies a pair of configuration items of next greatest similarity and performs the operations to be performed at Step S111 and subsequent steps (Step S115). If the greatest similarity is equal to or smaller than the threshold value (NO at Step S111), the decision receiving unit 24 finishes processing. The decision receiving unit 24 also finishes processing when the decision receiving unit 24 has received decisions for all the pairs of configuration items similarities therebetween have been calculated.

Advantages of Second Embodiment

As described above, according to the second embodiment, candidates of configuration items to be mapped across different schemas are generated based on relationships in the CMDB 14 to prompt for decision inputs about mappings in a descending order of similarities between the configuration items so that mapping information can be generated based on the decisions made by the user. This leads not only to significant saving of user's time and trouble but also to reduction in a period of time spent, when integrating different databases, to establish mappings between configuration items stored in the databases to be integrated. This also allows relatively right guess as to whether configuration items are similar CIs because the guess can be made based on the relationships in the CMDB 14.

[c] Third Embodiment

In the second embodiment described above, a total number of matching-attribute-value counts, the matching-attribute-value counts are identical in each hop, is employed as similarity; however, the invention is not limited thereto. The similarity can be obtained by a variety of calculation methods. Hence, various methods for calculating similarity based on hop count are described below in a third embodiment of the present invention.

Ratio of Matching-Attribute-Value Count

For instance, the similarity calculation unit 23 can employ a ratio of a matching-attribute-value count to the number (hereinafter, "attribute-value count") of all attribute values subjected to attribute-value comparison as similarity. How the similarity calculation unit 23 performs calculation will be described more specifically by way of an example where, as illustrated in FIG. 21, it is assumed that an attribute-value count of a pair of configuration items of hop count "0" is "7" and a matching-attribute-value count of the same is "6". It is also assumed that an attribute-value count of hop count "1" is "13" and a matching-attribute-value count of the same is "10" while an attribute-value count of hop count "2" is "12" and a matching-attribute-value count of the same is "10".

In this case, the similarity calculation unit 23 can obtain "26/32=0.8125" as similarity between the configuration items of hop count "0" by dividing a total of the matching-attribute-value counts "6+10+10=26" by a total of the attribute-value counts "7+13+12=32". FIG. 21 is a diagram illustrating an example of similarity calculated as a ratio of a matching-attribute-value count.

Sum of Matching-Attribute-Value Counts Each Multiplied by Reciprocal of Hop Count Alternatively, the similarity calculation unit 23 can employ a sum of matching-attribute-value counts each multiplied by (1/(n+1)), a reciprocal based on hop count n, as similarity. More specifically, as illustrated in FIG. 22, the similarity calculation unit 23 obtains "6" for a pair of configuration items of hop count "0" by multiplying a matching-attribute-value count "6" by a reciprocal "1/(0+1)=1". Similarly, the similarity calculation unit 23 obtains "5" for a pair of configuration items of hop count "1" by multiplying a matching-attribute-value count "10" by a reciprocal "1/(1+1)=0.5". Similarly, the similarity calculation unit 23 obtains "3.3" for a pair of configuration items of hop count "2" by multiplying a matching-attribute-value count "10" by a reciprocal "1/(2+1)=0.33".

Hence, the similarity calculation unit 23 can obtain "6+5+3.3=14.3", which is the sum of the counts each multiplied by a reciprocal, as similarity between the configuration items of hop count "0". FIG. 22 is a diagram illustrating an example of similarity calculated as a sum of matching-attribute-value counts each multiplied by a reciprocal of hop count.

Sum of Ratios of Matching-Attribute-Value Counts Each Multiplied by Reciprocal of Hop Count Alternatively, the similarity calculation unit 23 can use a sum of ratios of matching-attribute-value counts each multiplied by a reciprocal (1/(n+1)) of hop count n as similarity. More specifically, as illustrated in FIG. 23, the similarity calculation unit 23 obtains "0.86" for a pair of configuration items of hop count "0" by multiplying a ratio of a matching-attribute-value count "6/7=0.86" by a reciprocal "1/(0+1)=1". Similarly, the similarity calculation unit 23 obtains "0.38" for a pair of configuration items of hop count "1" by multiplying a ratio of a matching-attribute-value count "10/13" by a reciprocal "1/(1+1)=0.5". Similarly, the similarity calculation unit 23 obtains "0.28" for a pair of configuration items of hop count "2" by multiplying a ratio of a matching-attribute-value count "10/12" by a reciprocal "1/(2+1)=0.33".

Hence, the similarity calculation unit 23 can obtain "0.86+0.38+0.28=1.52", which is the sum of the ratios each multiplied by a reciprocal, as similarity between the configuration items of hop count "0". FIG. 23 is a diagram illustrating an example of similarity calculated as a sum of ratios of matching-attribute-value counts each multiplied by a reciprocal of hop count.

[d] Fourth Embodiment

In the second embodiment described above, when a decision input entered by a user has been received, a pair of configuration items of next greatest similarity is displayed; however, the present invention is not limited thereto. A decision made by a user can be used as feedback on similarity between another pair of configuration items. Hence, in a fourth embodiment of the present invention, various modifications, in each of which a decision made by a user is used as feedback on similarity between another pair of configuration items, will be described.

Using Doubled Similarity as Feedback

Figure 24:
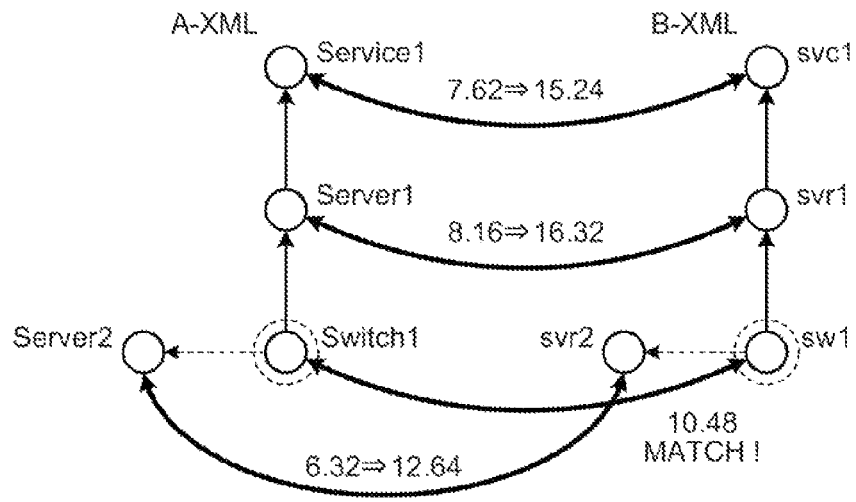
FIG. 24 is a diagram illustrating an example where doubled similarities are used as feedback from an already-made selection.

Assume that, for instance, in a situation where the screen illustrated in FIG. 18 is displayed on the display unit 13, the decision receiving unit 24 has detected that the "MATCH" button has been activated via the input unit 12. In response thereto, the decision receiving unit 24 doubles all calculated similarities between configuration items each having relationship with one of the configuration items, for which the "MATCH" button has been activated, as illustrated in FIG. 24. The decision receiving unit 24 can subsequently display a pair of configuration items, similarity between which is greatest among pairs of configuration items but for the pair of the configuration items, for which the "MATCH" button has been activated, on such a screen as described above on the display unit 13. FIG. 24 is a diagram illustrating an example where doubled similarities are used as feedback from an already-made selection.

In the example illustrated in FIG. 24, the decision receiving unit 24 calculates similarity between "Server2" and "svr2" of hop count "1" as "6.32×2=12.64". Similarly, the decision receiving unit 24 calculates similarity between "Server1" and "svr1" of hop count "1" as "8.16×2=16.32", and similarity between "Service1" and "svc1" of hop count "2" as "7.62×2=15.24". The decision receiving unit 24 prompts for a decision input on whether "Server1" and "svr1" of hop count "1" of greatest similarity are similar CIs.

Using Similarity Multiplied by Reciprocal of Hop Count as Feedback

Figure 25:
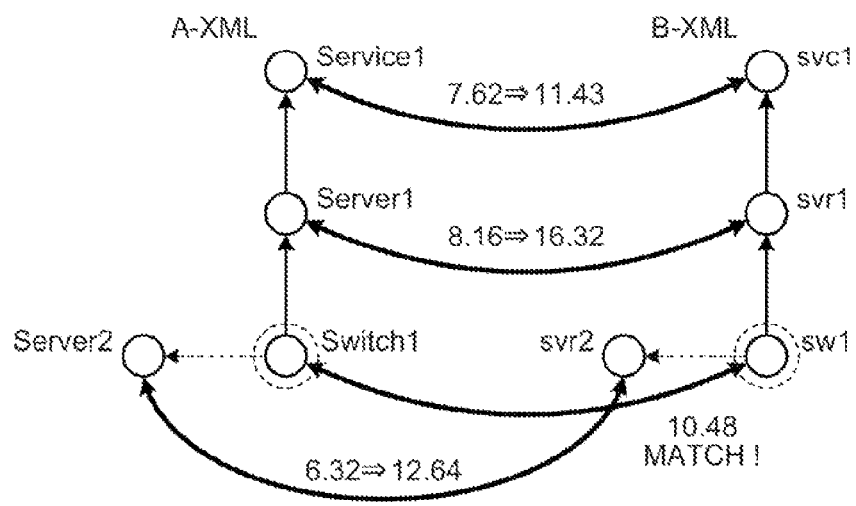
FIG. 25 is a diagram illustrating an example where similarities each multiplied by a reciprocal of hop count are used as feedback from an already-made selection.

Assume that, for instance, in a situation where the screen illustrated in FIG. 18 is displayed on the display unit 13, the decision receiving unit 24 has detected that the "MATCH" button has been activated via the input unit 12. In response thereto, the decision receiving unit 24 multiplies similarity of each hop count by "1+1/(hop count)", a double reciprocal based on hop count n, as illustrated in FIG. 25. Subsequently, the decision receiving unit 24 displays a pair of configuration items, similarity between which is greatest among pairs of configuration items except for the pair of configuration items, for which the "MATCH" button has been activated, on such a screen as described above on the display unit 13. FIG. 25 is a diagram illustrating an example where similarities each multiplied by a double reciprocal of hop count are used as feedback from an already-made selection.

In the example illustrated in FIG. 25, the decision receiving unit 24 calculates similarity between "Server2" and "svr2" of hop count "1" as "6.32×(1+1/1)=12.64". Similarly, the decision receiving unit 24 calculates similarity between "Server1" and "svr1" of hop count "1" as "8.16×(1+1/1)=16.32", and similarity between "Service1" and "svc1" of hop count "2" as "7.62×(1+1/2)=11.43". The decision receiving unit 24 prompts for a decision input on whether "Server1" and "svr1" of hop count "1" of greatest similarity are similar CIs.

Using Half Similarity as Feedback

Figure 26:
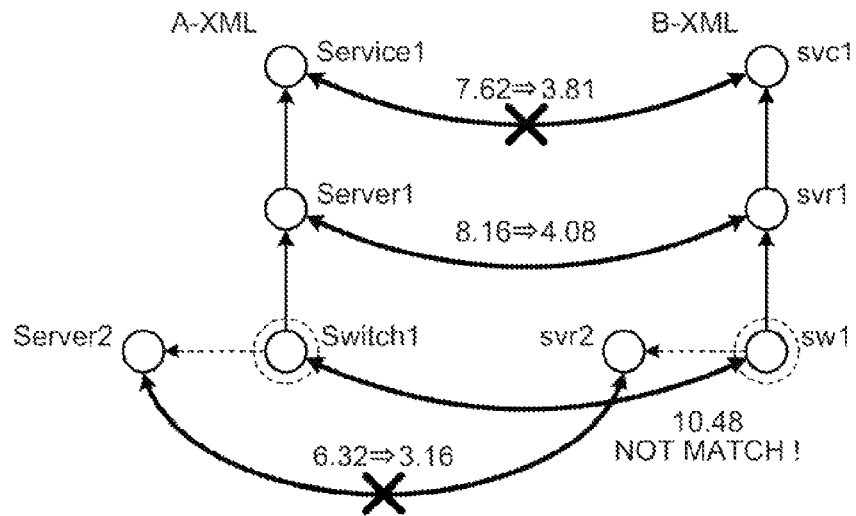
FIG. 26 is a diagram illustrating an example where reduced similarities are used as feedback from an already-made selection.

For instance, in a situation where the screen illustrated in FIG. 18 is displayed on the display unit 13 and the "NOT MATCH" button has been activated via the input unit 12, the decision receiving unit 24 can provide feedback so as to reduce similarity. For example, the decision receiving unit 24 multiplies similarities of each hop count by ½ as illustrated in FIG. 26. Subsequently, the decision receiving unit 24 displays a pair of configuration items of greatest one of similarities multiplied by ½ on such a screen as described above on the display unit 13. FIG. 26 is a diagram illustrating an example where reduced similarities are used as feedback from an already-made selection.

In the example illustrated in FIG. 26, the decision receiving unit 24 calculates similarity between "Server2" and "svr2" of hop count "1" as "6.32×½=3.16". Similarly, the decision receiving unit 24 calculates similarity between "Server1" and "svr1" hop count "1" as "8.16×½=4.08", and similarity between "Service1" and "svc1" of hop count "2" as "7.62×½=3.81". The decision receiving unit 24 excludes the pair of configuration items, half similarity between which is smaller than "4", from pairs of configuration items to be subjected to decision input and prompts for a decision input on whether "Server1" and "svr1", which is a remaining pair of configuration items of hop count "1", are similar CIs.

This allows, when a pair of configuration items are similar CIs, the similarity calculation apparatus 10 to assume that other pair of configuration items are highly possibly similar CIs and prompt a user for a decision input based on this assumption. This also allows, when a pair of configuration items are not similar CIs, the similarity calculation apparatus 10 to assume that other pair of configuration items are less likely similar CIs and prompt a user for a decision input based on this assumption. Accordingly, user's time and trouble can be further saved because accuracy of similarity guess can be improved by using an already-made decision as feedback.

[e] Fifth Embodiment

Embodiments of the present invention have been described; however, the invention is not limited thereto, and can be modified in various ways within the scope of the invention as set forth in the appended claims. Some of other modifications are described below.

Items about which Mapping Information is to be Generated

In each of the first to fourth embodiments described above, information about mappings between configuration items across databases that are to be virtually integrated into the FCMDB is generated; however, the present invention is not limited thereto. Alternatively, for example, mapping information between configuration information pieces that belong to an information system to be virtually integrated into an FCMDB but that are not stored in databases yet or the like can be used. Meanwhile, a file format of information stored in to-be-virtually-integrated databases is not necessarily limited to the XML-based file format descried above in the first to fourth embodiment. Even when information is stored in to-be-virtually-integrated databases in other file format than the XML-based file format, the information can be processed in a manner similar to that described above.

Relationship

In each of the first to fourth embodiments described above, hop count defined in advance is used as relationship between configuration items; however, the present invention is not limited thereto. Other relationship defined in advance can alternatively be employed.

Condition for Terminating Similarity Calculation

The similarity calculation apparatus according to an embodiment of the present invention can terminate the similarity calculation described above when similarities have been calculated for every pair of configuration items or when similarities have been calculated for every pair of configuration items at a top of relationship, for instance.

Number of Involved Databases

In each of the first to fourth embodiments described above, similarities of configuration items across two databases have been calculated to identify similar CIs; however, the present invention is not limited thereto. For instance, similarity among configuration items across three or more databases can be calculated in a manner similar to that of the embodiments described above to identify similar CIs.

Case where a Plurality of Configuration Items Have Relationships with a Plurality of Configuration Items In the similarity calculation method described in the first to fourth embodiments, in a situation where a plurality of configuration items have relationships with a plurality of configuration items, which pair of configuration items that have a relationship with each other is to be subjected to comparison is desirably determined. In this situation, the similarity calculation apparatus preferably performs controls to calculate, prior to the similarity calculation described above, similarities of every pair of the configuration items and adopt a pair of relatively high similarity so that the similarity calculation is performed without taking the thus-rejected pair into account.

This control will be described by way of the example illustrated in FIG. 15 where it is assumed that a user has specified "Switch1" in the A-XML and "sw1" in the B-XML. In this case, the first counting unit 21 refers to the databases indicated in FIG. 6 and FIG. 10 to find that there are three attribute values, or, more specifically, "sw01", "192.168.0.1", and "fujitsu", that are identical to each other. Hence, the first counting unit 21 stores a matching-attribute-value count, "3", in the count-value DB 15.

Subsequently, the similarity calculation apparatus identifies "Server1" that has a relationship of hop count of one with "Switch1" and "svr1" that has a relationship of hop count of one with "sw1". The similarity calculation apparatus compares the attribute information pertaining to "Server1" illustrated in FIG. 7 and the attribute information pertaining to "svr1" illustrated in FIG. 11 to find that there are three attribute values, or, more specifically, "svr01", "192.168.0.2", and "fujitsu", that are identical to each other and therefore determines that a matching-attribute-value count is "3". Subsequently, the similarity calculation apparatus calculates similarity between "Server2" that has a relationship of hop count of one with "Switch1" and "svr2" that has a relationship of hop count of one with "sw1". More specifically, the similarity calculation apparatus compares the attribute information pertaining to "Server2" illustrated in FIG. 8 and the attribute information pertaining to "svr2" illustrated in FIG. 12 to find that there are two attribute values, or, more specifically, "svr02" and "192.168.0.3", that are identical to each other and therefore determines that a matching-attribute-value count is "2".

The similarity calculation apparatus also calculates similarity between "Server1" that has a relationship of hop count of one with "Switch1" and "svr2" that has a relationship of hop count of one with "sw1". More specifically, the similarity calculation apparatus compares the attribute information pertaining to "Server1" illustrated in FIG. 7 and the attribute information pertaining to "svr2" illustrated in FIG. 12 and determines that a matching-attribute-value count is "0". The similarity calculation apparatus also calculates similarity between "Server2" that has a relationship of hop count of one with "Switch1" and "svr1" that has a relationship of hop count of one with "sw1". More specifically, the similarity calculation apparatus compares the attribute information pertaining to "Server2" illustrated in FIG. 8 and the attribute information pertaining to "svr1" illustrated in FIG. 11 and determines that a matching-attribute-value count is "0".

Hence, the matching-attribute-value count of the "Server1-svr1" pair is "3" while the matching-attribute-value count of the "Server2-svr2" pair is "2". The matching-attribute-value count of the "Server1-svr2" pair is "0" while the matching-attribute-value count of the "Server2-svr1" pair is "0". Accordingly, the similarity calculation apparatus determines to adopt the "Server1-svr1" pair and the "Server2-svr2" pair as pairs of configuration items to be subjected to the similarity calculation to be performed.

As described above, the similarity calculation apparatus is capable of comparing configuration items that have relationship of higher similarity with each other in a situation where a plurality of configuration items have relationships with a plurality of configuration items. This allows improvement in accuracy of mappings between configuration items stored in different databases to be virtually integrated.

System

Meanwhile, all or a part of processes described as processes to be performed automatically in the embodiments can be performed manually. All or a part of processes described as processes to be performed manually in the embodiments can be performed automatically. Information including operations procedure, control procedure, specific names, and the like described above or illustrated in the drawings, such as various data and parameters illustrated in FIG. 3 to FIG. 14, can be arbitrarily changed unless otherwise specified.

Note that the drawings functionally and conceptually illustrate structural elements of units and the like and each element is not necessarily physically constructed as illustrated in the drawing. Put another way, specific modes of distribution and integration of the various units and the like are not limited to those illustrated in the drawings; for instance, a mode where the first counting unit 21 and the second counting unit 22 are integrated together can be employed. All or some of the units and the like can be functionally or physically distributed or integrated in any unit according to various loads, usage, and the like. All or any desired part of processing functions to be performed by units and the like can be implemented by a CPU and a computer program that is to be parsed and executed by the CPU, or implemented as hardware by means of wired logic.

Computer Program

The processes described in the embodiments can be implemented by causing a computer system, such as a personal computer or a work station, to execute a computer program prepared in advance. An example computer system that executes computer programs that implement functions similar to those described in the embodiments will be described below.

Figure 27:
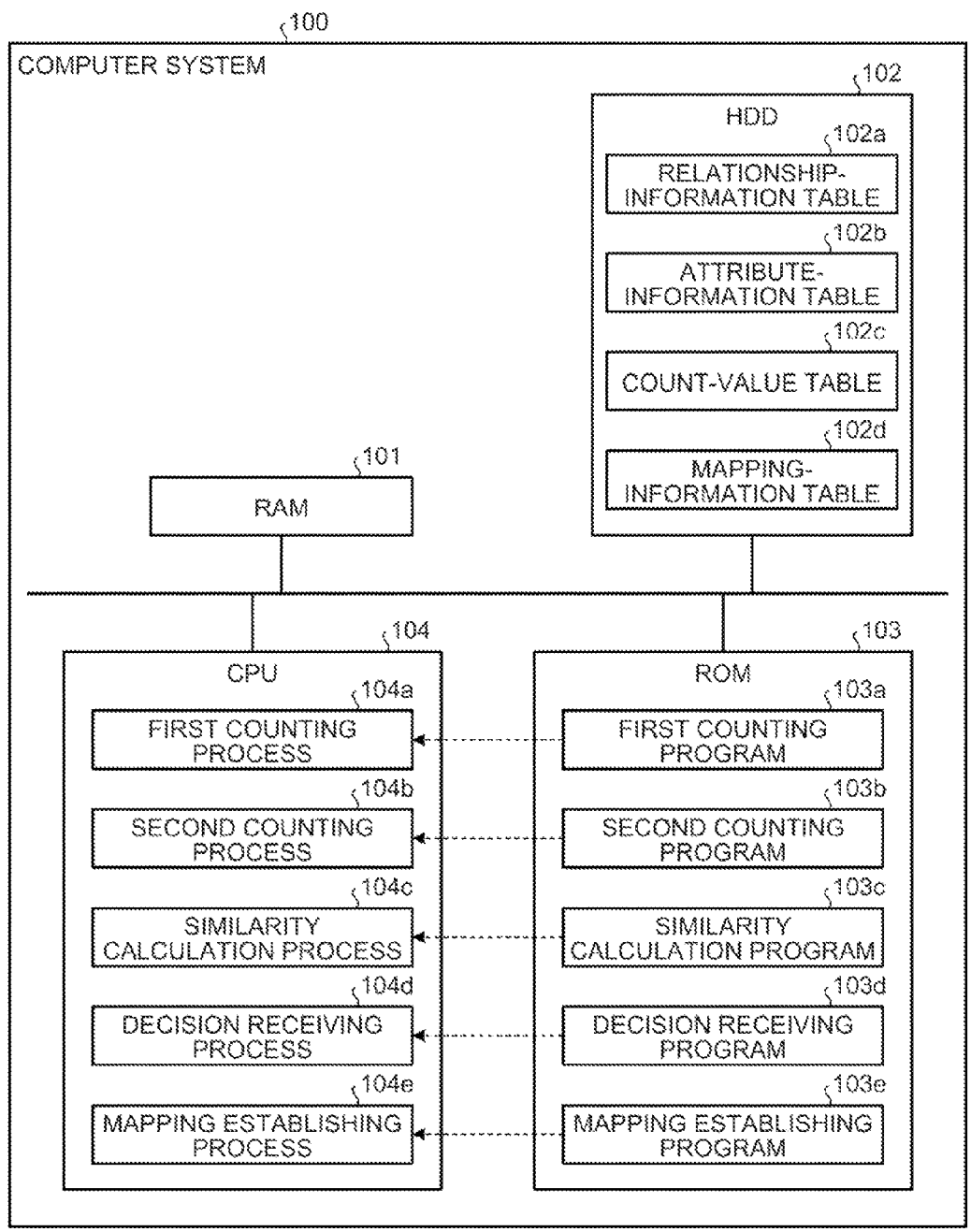
FIG. 27 is a schematic diagram illustrating a computer system 100 that executes a similarity calculation program.
Figure 28:
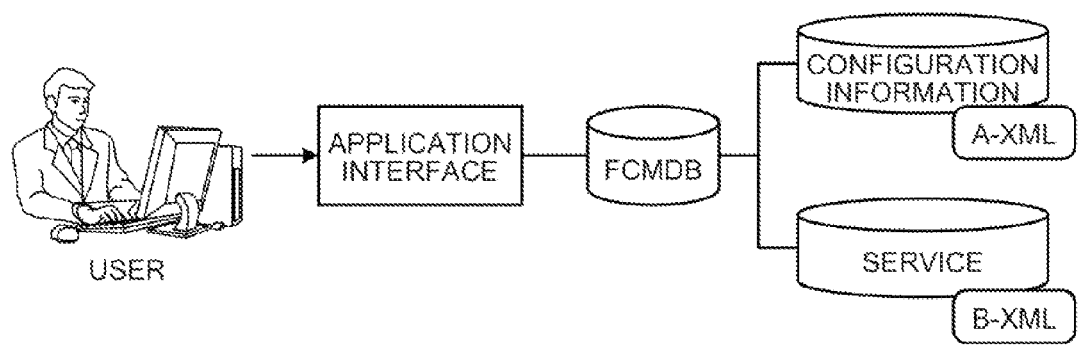
FIG. 28 is a diagram illustrating an example where different databases are virtually integrated through an FCMDB.

FIG. 27 is a schematic diagram illustrating a computer system 100 that executes a similarity calculation program. As illustrated in FIG. 27, the computer system 100 includes random access memory (RAM) 101, a hard disk drive (HDD) 102, read only memory (ROM) 103, and a CPU 104. Computer programs that implement the functions similar to those described in the embodiments are stored in the ROM 103 in advance. More specifically, as illustrated in FIG. 27, a first counting program 103a, a second counting program 103b, a similarity calculation program 103c, a decision receiving program 103d, and a mapping establishing program 103e are stored in the ROM 103 in advance.

The CPU 104 reads and executes these programs 103a to 103e to perform corresponding processes as illustrated in FIG. 27. More specifically, the CPU 104 performs a first counting process 104a, a second counting process 104b, a similarity calculation process 104c, a decision receiving process 104d, and a mapping establishing process 104e. Meanwhile, the first counting process 104a, the second counting process 104b, and the similarity calculation process 104c correspond to the first counting unit 21, the second counting unit 22, and the similarity calculation unit 23 illustrated in FIG. 2, respectively. The decision receiving process 104d and the mapping establishing process 104e correspond to the decision receiving unit 24 and the mapping establishing unit 25, respectively.

A relationship-information table 102a, an attribute-information table 102b, a count-value table 102c, and a mapping-information table 102d are provided in the HDD 102. The relationship-information table 102a, the attribute-information table 102b, the count-value table 102c, and the mapping-information table 102d corresponds to the relationship-information DB 14a, the attribute-information DB 14b, the count-value DB 15, and the mapping-information DB 16 illustrated in FIG. 2, respectively.

Note that the programs 103a to 103e are not necessarily stored in the ROM 103. For instance, the programs can alternatively be stored in a "portable physical medium", such as a flexible disk (FD), a compact disc-read-only memory (CD-ROM), a magneto optical (MO) disk, a digital versatile disk (DVD), or an integrated circuit (IC) card, for use by being inserted into the computer system 100. Further alternatively, the programs can be stored in a "fixed physical medium", such as an HDD provided inside or outside the computer system 100. Further alternatively, the programs can be stored in "other computer system" coupled to the computer system 100 via a public line, the Internet, a LAN, a wide-area network (WAN), or the like. The computer system 100 can be configured to read the programs from the medium or the computer system and execute the programs.

More specifically, the programs in the modification are stored in a recording medium, such as the "portable physical medium", the "fixed physical medium", or a "communication medium" described above, in a computer-readable form. The computer system 100 reads the programs from such a recording medium and executes the programs, thereby implementing the functions similar to those described in the embodiments. The programs in the modification are not necessarily executed by the computer system 100. The present invention is applicable to, for instance, such a configuration where other computer system or server executes the programs or a configuration where other computer system and server execute the programs in cooperation with each other.

According to an embodiment of the present invention, when different databases are to be integrated, a period of time spent to establish mappings, across the databases, between configuration items stored in the databases can be advantageously saved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A computer-readable, non-transitory medium storing therein a program for calculating similarity causing a computer to execute a process comprising:
    first counting a matching-attribute-value count by comparing, across a plurality of databases that store configuration items belonging to an information system, attribute values of one configuration item in each of the databases, the matching-attribute-value count being number of attribute values that are identical to each other;
    second counting a matching-attribute-value count by comparing, across the plurality of databases, attribute values of a configuration item that has a predetermined relationship with the one configuration item in each of the databases;
    calculating similarity between the configuration items, of which matching-attribute-value counts each have been counted at any one of the first counting and the second counting, based on the matching-attribute-value count counted at the first counting and the matching-attribute-value count counted at the second counting;
    receiving a decision input by displaying a plurality of pairs of the configuration items, similarities between which have been calculated at the calculating, in a descending order of the similarities on a predetermined display unit, the decision input indicating whether each of the pairs of the configuration items, about which the decision input has been received, is identical configuration items; and
    generating mapping information about mapping between the configuration items across the databases based on the decision input received at the receiving,
    wherein, at the receiving, similarities between pairs of configuration items excluding the pair of configuration items, about which the decision input has been received, are updated according to a decision of the decision input and the pairs of the configuration items are displayed in a descending order of the similarities to receive a decision input that indicates whether each of the pairs of the configuration items, the similarity between which has been calculated, is identical configuration items.

2. The computer-readable, non-transitory medium according to claim 1, wherein, at the calculating, the similarity is calculated based on a ratio of the matching-attribute-value counts to a total of attribute-value counts, each of the attribute-value counts being number of attribute values belonging to one of the configuration items.

3. A similarity calculation apparatus comprising:
    a relationship-information storage unit that stores relationships between configuration items in a plurality of databases, the configuration items belonging to an information system;
    a first counting unit that compares, across the plurality of databases, attribute values of one configuration item in each of the databases, thereby counting a matching-attribute-value count that is number of attribute values that are identical to each other;
    a second counting unit that identifies a configuration item having a predetermined relationship with the one configuration item in each of the databases from the relationship-information storage unit and compares, across the plurality of databases, attribute values of the configuration item that has the predetermined relationship with the first configuration item and attribute values of the configuration items identified from the relationship-information storage unit to count a matching-attribute-value count;
    a similarity calculation unit that calculates similarity between the configuration items, of which matching-attribute-value counts each have been counted by any one of the first counting unit and the second counting unit, based on the matching-attribute-value count counted by the first counting unit and the matching-attribute-value count counted by the second counting unit;
    a decision receiving unit that receives a decision input by displaying a plurality of pairs of the configuration items, similarities between which have been calculated at the calculating, in a descending order of the similarities on a predetermined display unit, the decision input indicating whether each of the pairs of the configuration items, about which the decision input has been received, is identical configuration items; and
    a mapping establishing unit that generates mapping information about mapping between the configuration items across the databases based on the decision input received by the decision receiving unit,
    wherein, the decision receiving unit updates similarities between pairs of configuration items excluding the pair of configuration items, about which the decision input has been received, according to a decision of the decision input and displays the pairs of the configuration items in a descending order of the similarities to receive a decision input that indicates whether each of the pairs of the configuration items, the similarity between which has been calculated, is identical configuration items.

4. A similarity calculation apparatus comprising:
    a memory; and
    a processor, wherein the processor executes:
    first counting a matching-attribute-value count by comparing, across a plurality of databases that store configuration items belonging to an information system, attribute values of one configuration item in each of the databases, the matching-attribute-value count being number of attribute values that are identical to each other;
    second counting a matching-attribute-value count by comparing, across the plurality of databases, attribute values of a configuration item that has a predetermined relationship with the one configuration item in each of the databases;
    calculating similarity between the configuration items, of which matching-attribute-value counts each have been counted at any one of the first counting and the second counting, based on the matching-attribute-value count counted at the first counting and the matching-attribute-value count counted at the second counting;

receiving a decision input by displaying a plurality of pairs of the configuration items, similarities between which have been calculated at the calculating, in a descending order of the similarities on a predetermined display unit, the decision input indicating whether each of the pairs of the configuration items, about which the decision input has been received, is identical configuration items; and generating mapping information about mapping between the configuration items across the databases based on the decision input received at the receiving, wherein, at the receiving, similarities between pairs of configuration items excluding the pair of configuration items, about which the decision input has been received, are updated according to a decision of the decision input and the pairs of the configuration items are displayed in a descending order of the similarities to receive a decision input that indicates whether each of the pairs of the configuration items, the similarity between which has been calculated, is identical configuration items.

5. A similarity calculation method comprising:

first counting a matching-attribute-value count by comparing, across a plurality of databases that store configuration items belonging to an information system, attribute values of one configuration item in each of the databases, the matching-attribute-value count being number of attribute values that are identical to each other;

second counting a matching-attribute-value count by comparing, across the plurality of databases, attribute values of a configuration item that has a predetermined relationship with the one configuration item in each of the database;

calculating similarity between the configuration items, of which matching-attribute-value counts each have been counted at any one of the first counting and the second counting, based on the matching-attribute-value count counted at the first counting and the matching-attribute-value count counted at the second counting receiving a decision input by displaying a plurality of pairs of the configuration items, similarities between which have been calculated at the calculating, in a descending order of the similarities on a predetermined display unit, the decision input indicating whether each of the pairs of the configuration items, about which the decision input has been received, is identical configuration items; and generating mapping information about mapping between the configuration items across the databases based on the decision input received at the receiving, wherein, at the receiving, similarities between pairs of configuration items excluding the pair of configuration items, about which the decision input has been received, are updated according to a decision of the decision input and the pairs of the configuration items are displayed in a descending order of the similarities to receive a decision input that indicates whether each of the pairs of the configuration items, the similarity between which has been calculated, is identical configuration items.

* * * * *